UNITED STATES PATENT OFFICE.

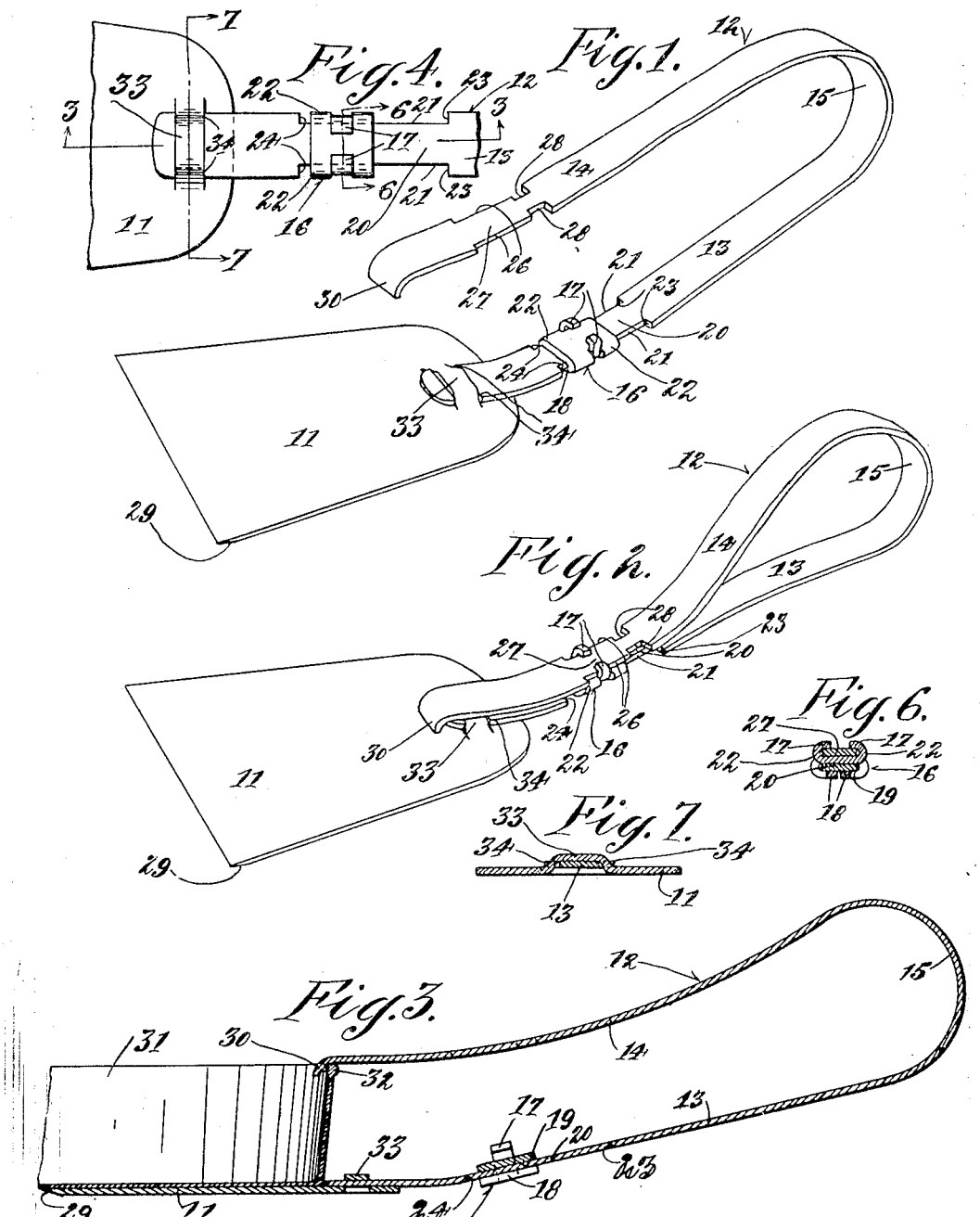

JACOB KIRCHMER, JR., OF ELMWOOD PLACE, OHIO.

COMBINATION KITCHEN UTENSIL.

1,035,198.

Specification of Letters Patent.   Patented Aug. 13, 1912.

Application filed January 2, 1912. Serial No. 669,021.

*To all whom it may concern:*

Be it known that I, JACOB KIRCHMER, Jr., a citizen of the United States, residing at Elmwood Place, in the county of Hamilton and State of Ohio, have invented certain new and useful Improvements in Combination Kitchen Utensils, of which the following is a specification.

It is the object of my invention to provide a combination kitchen utensil arranged to be used as a turner for food being cooked, such as pancakes, eggs, potatoes, and the like, when the parts of my improved device are in one relation, and arranged to be used as a lifter for articles, such as pans, plates, and the like, upon or in which the cooking takes place, when the parts of my improved device are in another relation.

The invention will be readily understood from the following description and claims, and from the drawing, in which latter:—

Figure 1 is a perspective view of my improved device shown in open relation for employment as a lifter. Fig. 2 is a similar view of the same, showing the same in closed relation for employment as a turner. Fig. 3 is a central axial section of my improved device, taken on a line corresponding to the line 3—3 of Fig. 4, showing its application in lifting a pan, the pan being shown in similar section and partly broken away. Fig. 4 is a plan view of my improved device, partly broken away. Fig. 5 is a bottom perspective of the clasp of my improved device. Fig. 6 is a detail in section on a line corresponding to the line 6—6 of Fig. 4, showing the clasp in clasping relation; and, Fig. 7 is a detail in section on the line 7—7 of Fig. 4, showing the means for attaching the handle to the blade.

11 represents the blade or shovel.

12 is a handle, which is a handle made of spring-material, and comprises the leaves 13 and 14, connected by a bowed portion 15.

16 is a clasp. This clasp has keepers 17 struck upwardly therefrom and flanges 18 bent downwardly and inwardly toward each other for forming a guideway 19, the keepers being struck up from the metal of said flanges. A reduced shank 20 in the leaf 13 is formed by providing the said leaf with rabbets 21. The shank is received in the guideway of the clasp, the side walls 22 of the clasp being received in said rabbets, the width of the clasp being substantially equal to the width of the shank. The clasp is slidable lengthwise of said shank. The movements of the clasp are limited by the shoulders 23, 24, at the ends of said rabbets. The leaf 14 is provided with side rabbets 26, for forming a reduced shank 27 therein, the shank 27 being arranged to be received under the keepers 17 when the leaves are locked in connected relation, as shown in Fig. 2. The keepers are received through notches 28 in said shank 27 for placing the keepers above said shank when the leaves are pressed together, thereby forcing said keepers through said notches, whereupon the clasp may be moved toward the blade 11 for locking the leaves 13 and 14 together. When the leaves 13 and 14 are thus locked together, the handle forms a rigid handle for the blade 11, in which condition the device is used as a food-turner, for instance, an egg-turner, pancake-turner, or the like. The front edge of the blade is preferably beveled as shown at 29.

If it is desired to use the device as a pan-lift, or a plate-lift, or the like, for instance for placing pans or plates into or out of hot ovens, and for other purposes, the clasp 16 is slipped back so as to release the leaf 14 from the leaf 13, the leaf 14 then having spring connection with the leaf 13 and being normally raised above the leaf 13. The end of the leaf 14 nearest the blade 11, is provided with a downward bend 30.

A pan is indicated at 31. When using the device as a lift, the user's hand surrounds the leaves, and the blade 11 is slipped under the article to be lifted, instanced as the pan 31, and the leaf 14 pressed downwardly for causing the bent end 30 of the leaf 14 to impinge the upper edge of the rim 32 of the pan, thereby securely holding the pan on the blade 11 and permitting the pan to be readily transported. The rear portion of the blade has a band 33 struck up therefrom which is received above the front end of the leaf 13 and pressed into recesses 34 in the front end for securing said handle and blade together.

Having thus fully described my invention, what I claim as new and desire to secure by Letters Patent, is:

The combination kitchen utensil herein described comprising a lifting blade, a handle consisting of spring-material formed with an upper leaf and a lower leaf having a bowed portion between them, the end of said lower leaf secured to said blade and the end of said upper leaf provided with a downward bend, said leaves provided with reduced shanks intermediate of their ends, and a catch provided with keepers, said catch slidable on one of said reduced shanks, and the other of said reduced shanks having notches through which said keepers are received at one position of said catch, and said keepers received over said last-named reduced shank at another position of said catch for locking said leaves together, substantially as described.

In testimony whereof, I have hereunto signed my name in the presence of two subscribing witnesses.

JACOB KIRCHMER, Jr.

Witnesses:
FRANK J. REBHOLZ,
JNO. KOEHL, Jr.